F. & N. M. SPRANGER.
DEMOUNTABLE RIM FOR VEHICLE WHEELS.
APPLICATION FILED MAR. 11, 1915.
1,220,471.
Patented Mar. 27, 1917.
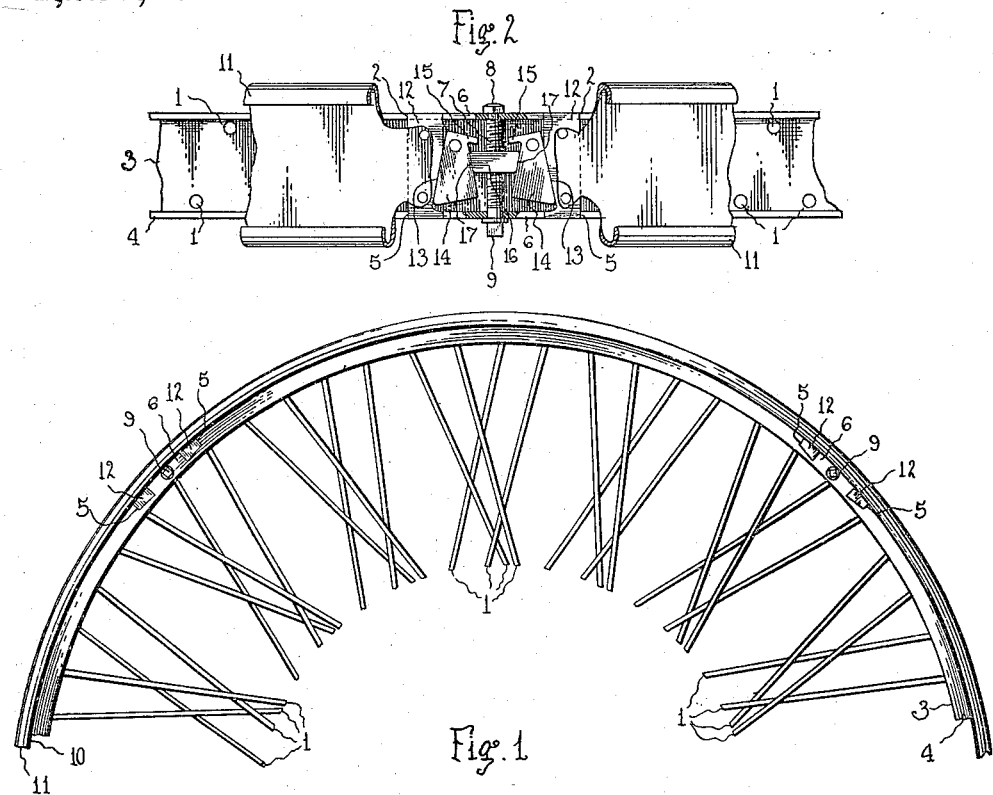
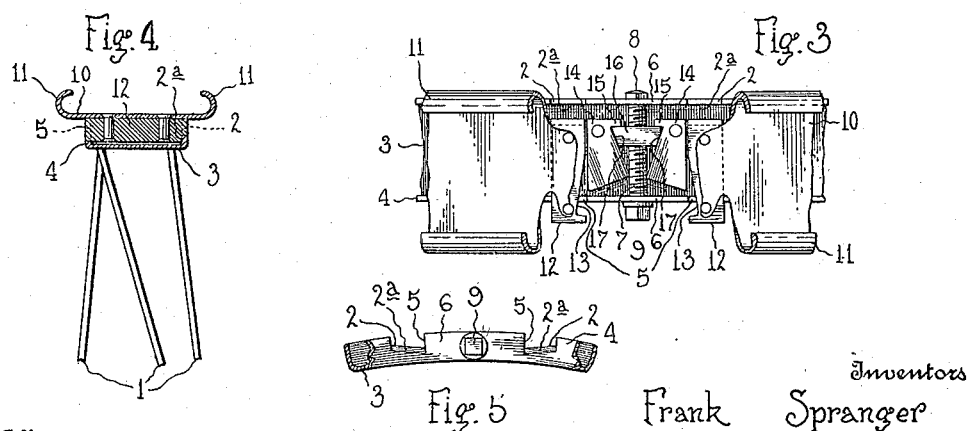
Witnesses
Chas. W. Stauffiger
Anna M. Dorr
Inventors
Frank Spranger
Nicholas M. Spranger
By
Attorneys

UNITED STATES PATENT OFFICE.

FRANK SPRANGER AND NICHOLAS M. SPRANGER, OF DETROIT, MICHIGAN, ASSIGNORS TO SPRANGER RIM AND WHEEL COMPANY, OF DETROIT, MICHIGAN, A CORPORATION OF MICHIGAN.

DEMOUNTABLE RIM FOR VEHICLE-WHEELS.

1,220,471.      Specification of Letters Patent.      Patented Mar. 27, 1917.

Application filed March 11, 1915. Serial No. 13,800.

*To all whom it may concern:*

Be it known that we, FRANK SPRANGER and NICHOLAS M. SPRANGER, citizens of the United States of America, residing at Detroit, in the county of Wayne and State of Michigan, have invented certain new and useful Improvements in Demountable Rims for Vehicle-Wheels, of which the following is a specification, reference being had therein to the accompanying drawings.

This is an improvement in connection with our Patent No. 1,069,349, granted Aug. 5, 1913, disclosing a demountable rim for wooden wheels, whereas the present invention relates to a demountable rim that has been especially designed for metallic wheels.

In our prior patent, the wood felly of the wheel is provided with a channel iron rim and it is necessary to bolt this rim to the wood felly. In the present improvement, we utilize the channel iron rim for the rim member of a wire wheel and the following advantages are gained:

First, by constructing the rim member of a wire spoke wheel to accommodate a demountable tire rim, we obviate the necessity of carrying an extra wire wheel for emergency purposes.

Second, by making the rim member of a wire spoke wheel a deep channel, we attain greater rigidity and afford a better purchase for the wire spokes of the wheel.

To attain the above advantages, we construct the parts of the wheel with a view of reducing the cost of manufacture and at the same time retain the features by which safety, durability, simplicity and ease of fabrication are secured, and with such ends in view our invention resides in the novel construction, combination and arrangement of parts to be hereinafter specifically described and then claimed.

Reference will now be had to the drawing, wherein—

Figure 1 is a side elevation of a portion of a metallic wheel provided with a demountable rim;

Fig. 2 is an enlarged detail of a portion of the wheel rim and fastening means, with the parts broken away to show the construction and the fastening means in a locked position;

Fig. 3 is a similar view showing the fastening means in an unlocked position;

Fig. 4 is a transverse sectional view of the wheel rim, and

Fig. 5 is a side elevation of a portion of the same.

In the drawings, 1 denotes the wire spokes of a wheel which are connected to a channel iron rim 3, the outer side flange 4 of said rim having pairs of notches 5 and the inner side flange pairs of notches 2, the pairs of notches being disposed at three or more points around the rim. The notches 5 are of greater depth than the notches 2 and the pairs of notches transversely aline with the pairs of notches 2 presenting abutments or shoulders 2$^a$ as best shown in Figs. 4 and 5. Each pair of notches forms between them a lug 6 and the notch walls formed by the ends of the lug are of greater depth than the other notch walls. Each lug is provided with an opening forming one bearing for a screwthreaded bolt or shaft 7 which extends across the channel iron rim and has a bearing in the opposite flange thereof. Each screw bolt or shaft is provided with a nut 8 at one end to hold the bolt or shaft in place in its bearings and permits the same to turn freely therein, while at its opposite end is a squared head 9 for the engagement of a wrench or other tool for turning the bolt or shaft.

10 denotes a demountable rim of the usual form and construction provided with inturned edge flanges 11 to engage and hold a pneumatic or other tire in the usual manner. Riveted or otherwise secured upon the inner face of this demountable rim are blocks 12 arranged in pairs corresponding to the pairs of notches in the flange 4 of the channel rim to slide through said notches when the demountable rim is slipped laterally into place upon the channel rim and to engage said notches when in place and prevent the demountable rim from turning upon the channel rim. The blocks 12 correspond in cross section to the notches 2 and 5 of the channel iron rim 3 and as said blocks obtain a firm purchase against the end walls of the lugs 6, it is practically impossible for the demountable rim to shift circumferentially of the channel iron rim. The blocks 12 are of such length that when the demountable rim is in place, the notches 2 and 5 are completely filled, as best shown in Fig. 1, and the inner ends of said blocks engage the shoulders 2ª, thus limiting the sliding on movement of the demountable rim and correctly centering the same upon the channel iron.

The manner of locking the block 12 in engagement with the channel iron rim is best understood by quoting a portion of the descriptive matter of our prior Patent No. 1,069,349:

"Each pair of blocks 12 is formed in their adjacent sides with notches 13 adapted to be engaged by dogs 14 which are pivotally secured intermediate of their ends to the channel rim, one at each side of each screw bolt 7. These dogs are each formed at one end to fit within the corresponding notch 13 in the adjacent block 12 when the detachable rim is in place and at their opposite ends are formed with a laterally extending lug 15 adapted to be engaged by a nut 16 upon the screw bolt 7. Each of these nuts 16 is prevented from turning upon the screw bolt by its engagement with the bottom channel rim and it is formed with slanting sides 17 to engage the slanting edges of the dogs and form a wedge to move between the dogs and positively force said dogs to turn upon their pivots laterally each way from the screw bolts into engagement with the notches 13 in the adjacent blocks 12. The movement of the nut 16 in one direction by the turning of the screw bolt, moves its inclined or cam sides into engagement with the sides of the dogs and turns the same into the notches 13, thus turning said dogs within said notches by its wedge action. Upon the movement of the nut 16 in an opposite direction, said nut engages the laterally extending lugs 15 on the dogs and swings said dogs out of the notches 13 toward the screw bolt, unlocking the demountable rim and permitting of the same being removed laterally from the channel rim, the blocks 12 sliding through the notches 5 past the dogs."

From the foregoing it will be observed that the channel iron rim serves functionally as a felly or felly member and besides having the wire spokes attached thereto, said rim serves as a housing for the fastening means which we employ for retaining the demountable rim upon the felly member. This construction obviates the necessity of placing an additional felly member upon that carried by the spokes in order to accommodate our demountable rim fastening devices, consequently the metallic vehicle wheel in accordance with our invention can be expeditiously manufactured at a comparatively small cost. We believe we are the first to place a demountable rim upon a wire spoke wheel by simply utilizing two circumferential members, one of which is fixed and the other detachably held thereby. With this thought in view, it is our aim to obtain protection upon the principle involved and set forth in the appended claim, rather than upon the details of construction.

What we claim is:—

In a demountable rim for vehicle wheels, a channel iron rim having inner and outer flanges each provided with pairs of notches, the pairs of notches of one flange transversely alining with the pairs of notches of the other flange, the notches of the inner side flange of less depth than the outer side flange to provide abutments below the notches of the inner side flange, a demountable rim on the peripheral edges of the inner and outer flanges of said channel iron rim, blocks carried by said demountable rim and snugly fitting in the notches of the inner and outer flanges of said channel iron rim and having the inner end portions thereof undercut to receive the abutments of the inner side flange of said channel iron rim for preventing circumferential movement of said demountable rim relative to said channel iron rim and to limit the inward movement of said blocks in said notches, and means in said channel iron rim adapted to lock said blocks in the notched flanges of said channel iron rim.

In testimony whereof we affix our signatures in presence of two witnesses.

FRANK SPRANGER.
NICHOLAS M. SPRANGER.

Witnesses:
C. R. STICKNEY,
ANNA M. DORR.

Copies of this patent may be obtained for five cents each, by addressing the "Commissioner of Patents, Washington, D. C."